Oct. 1, 1940.    H. AUGER ET AL    2,216,637
STORAGE AND LIKE EQUIPMENT FOR VEHICLES
Filed April 17, 1939    6 Sheets-Sheet 1

INVENTORS
HAROLD AUGER
WARD E. PEARSON, Deceased, By
    Natalie P. Nicholson, Executrix
BY    *Norris & Bateman*
ATTORNEYS

Patented Oct. 1, 1940

2,216,637

UNITED STATES PATENT OFFICE 2,216,637

STORAGE AND LIKE EQUIPMENT FOR VEHICLES

Harold Auger, Burnham, England, and Ward Edgerly Pearson, deceased, late of London, England, by Natalie Pearson Nicholson, executrix, Maidenhead, England Application April 17, 1939, Serial No. 268,396
In Great Britain April 21, 1938

8 Claims. (Cl. 214—16.1)

This invention relates to storage equipment for cars.

The present invention comprises storage equipment for cars in each of which provision is made for storing cars in two ranks, which are side-by-side, and for circulating cars around the unit, and includes the provision of a plurality of platforms spaced apart for supporting the wheels of each car, there being either an individual platform for supporting each wheel or separate platforms for supporting each end pair or side pair of wheels, or one pair of wheels being supported by one platform and the other pair by individual platforms, and apparatus is provided for shifting said car supporting sets of platforms along the ranks and for transferring them between adjacent ends of the two ranks, there being a vacant space at one corner or vacant spaces at diametrically opposite corners so that by an alternate succession of rank shifting and transfer operations the cars may be circulated around the unit.

Preferably, the platforms constituting each car supporting set are mechanically separated and the apparatus for shifting them along the ranks and for transferring them between the ranks is so arranged that the component platforms of each set are moved synchronously so that their relative positioning remains substantially constant.

In other cases connections, e. g. connecting struts, may interconnect some or all of the component platforms of a car supporting set.

According to a preferred form the platforms are so arranged that the cars supported thereby are disposed longitudinally of the ranks and the cars are each supported by two platforms, the front wheels being supported by one platform and the rear wheels by the other platform.

The apparatus may be automatically controlled so that the various movements are effected in a recurring sequence so as to circulate the cars until a control member has been moved to an "off" position or until a preselected number of cycles of movement have been performed.

In carrying out the invention the platforms may be provided on the underside with rollers running on fixed rails extending along the ranks or alternatively the platforms may run on fixed rollers distributed along the ranks, and the platforms may be provided with depending lugs or pillars at or adjacent their corners, which pillars are adapted to support the platforms independently of the rank supports during transverse movement between the ranks, the platforms being located above the floor, which is provided with grooves to accommodate the pillars during movement along the ranks and during transverse movement between the ranks.

Such a construction possesses the advantage that excepting at the ends of the ranks where certain constructions may necessitate recessing for the transverse movement the floor is practically continuous and is broken only by the grooves which may be quite narrow, whilst furthermore, this construction provides for surface drainage of the floor.

The transverse movement is preferably effected by laterally movable carriage apparatus on which the platform pillars are adapted to rest so as to support the platforms. Loading may be effected either by lowering the end supports until the pillars rest on the carriage apparatus or by raising the carriage apparatus so as to engage the pillars and lift the platforms clear of the rank supports and unloading may be performed by complementary movements.

In order that the invention may be more clearly understood reference will now be made to the accompanying drawings, wherein.

Figure 1:
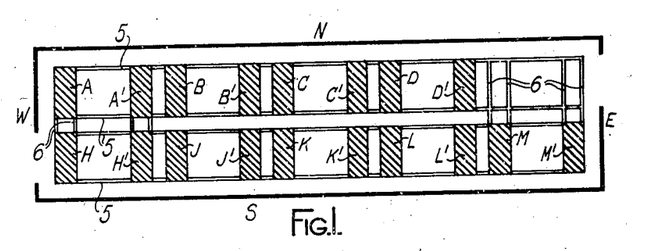
Figs. 1–4 show diagrammatically examples of layouts of a unit for storing cars.

Referring first of all to Fig. 1, the unit is, for purposes of description assumed to be arranged in an east and west direction, the platforms being arranged in two ranks side by side. These ranks will be referred to as the north rank and the south rank respectively. It will be observed that the unit is surrounded by a wall with inlets at the south-west and north-east corners, and normally one of these would constitute the entry position and the other the exit position. For purposes of description it will be assumed that the north-east corner is the entry position and the south-west corner the exit position.

The unit shown has provision for storing nine cars, the cars being arranged longitudinally of the unit and facing west. Each car is supported by two platforms, of which one supports the front wheels and the other the rear wheels. Thus the platforms A, A' would constitute a set and would together support a car, the front wheels resting on the platform A and the rear wheels on the platform A'. Similarly the platforms B, B' would support another car. When it is desired to place a car in the unit the sets of platforms will be circulated until a vacant set of platforms is opposite the entry, that is to say in the north-east corner position. As shown, the north-east position is vacant of platforms, it being necessary to leave one position vacant to permit of the circulation of platforms. The platforms are circulated by alternately shifting them along the ranks and transferring them between the ranks. Thus, supposing the cars are to be circulated in a clockwise direction, the north rank of platforms together with the cars supported by them would be moved eastwards through one car distance so that the platforms D, D' now occupy the north-east corner, this will leave a vacancy at the north-west corner; the platforms H, H' will now be transferred northwards into the north-west corner, this will leave a vacancy in the south-west corner. The south rank will now be moved westwards so that when the platforms J, J' occupy the south-west corner there is a vacancy at the south-east corner. Finally the platforms D, D', which it will be remembered are at present in the north-east corner, are moved southwards so that they occupy the south-east corner. The above described movements constitute one cycle and it will be observed that they have the effect of shifting all the sets of platforms, and the cars supported by the platforms, around the unit through one car position. By successive repetition of this cycle the platforms may be circulated until the desired positioning is obtained.

As mentioned above, when placing a car in the unit this circulation is continued until an empty set of platforms is brought into the north-east entry position, whilst when it is desired to take a car out of the unit the platforms will be circulated until the car it is desired to remove is located in the south-west or exit position.

Figure 2:
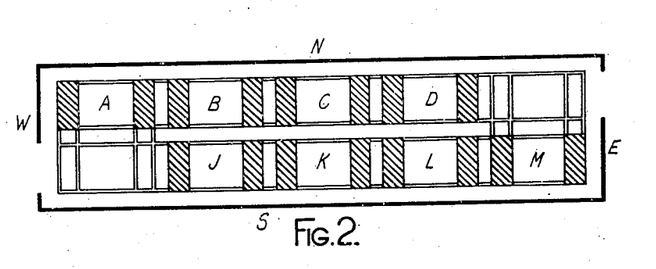

Fig. 2 shows an arrangement which is similar to that shown in Fig. 1 excepting that two vacant spaces are provided, namely at the south-west and north-east corners. With this arrangement the two ranks may be moved simultaneously in opposite directions and similarly transfer may take place at the two ends in opposite directions. Thus, in order to circulate the cars in a clockwise direction, as described above, the north rank would be moved eastwards and simultaneously the south rank would be moved westwards. The platforms D will now occupy the north-east corner and the platforms J will occupy the south-west corner, there being vacancies at the north-west and south-east corners. The next movement will be to move the platforms J northwards and simultaneously the platforms D southwards; there will then again be vacancies at the north-east and south-west corners as shown in Fig. 2. All the platforms, however, will be moved round one car position. Thus it will be appreciated that with the arrangement of Fig. 2 there are only two movements for each cycle, whereas in Fig. 1 there are four movements. Thus the Fig. 2 arrangement provides a more rapid circulation, but at the same time it is not so efficient as the Fig. 1 arrangement in utilization of the available storage space, inasmuch as it is necessary to provide two vacant spaces instead of only one.

Figure 3:
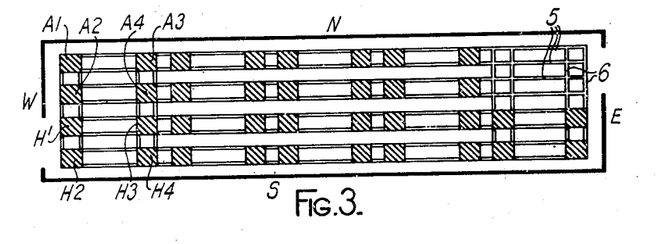

Fig. 3 shows a modified construction in which the arrangement is similar to that shown in Fig. 1 except that in this case there are four component platforms in each car supporting set, i. e. one platform for each wheel.

In the drawings references have only been given to the platform A in the north-west corner. It will be observed that the platforms A1 and A2 will respectively support the front wheels of a car and the platforms A3 and A4 the rear wheels. The other sets of platforms are all similarly arranged.

Figure 4:
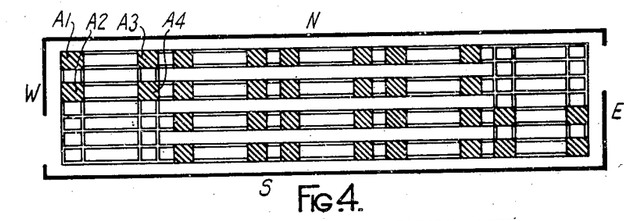

Fig. 4 shows a construction employing four platforms for each car as shown in Fig. 3 but with two vacant spaces as in the arrangement of Fig. 2. The relative merits of the two-platform and four-platform types of equipment will be explained later.

Referring now to Figs. 5–10 which show an embodiment of the invention corresponding to that shown diagrammatically in Fig. 1, the platforms, which are also designated by the general reference 1, are provided with rollers 2 (Figs. 8–10) running on rails 3 extending along the ranks. The platforms are also provided with depending lugs or pillars 4, there being one pillar at each corner of each platform. The pillars 4 project downwardly into channels or grooves 5 in the floor which extend along the ranks. Transverse grooves 6 interconnect the grooves 5 of the two ranks at each end of the unit and accommodate the pillars during the transfer movements of the platforms between the ranks. The movement along the ranks is effected by rank shifting rods 7 which extend the length of each rank less one car position; the rods 7 carry fork members 8 which engage the pillars 4 of the platform. The rods 7 may be moved longitudinally of the ranks through a distance equivalent to one car position, this being the amount by which the platforms are moved each time. As will be explained subsequently provision is made for partially rotating the rods so that the forks 8 may be moved into inoperative positions during their return movements. The longitudinal movement of the rank shifting rod 7 is controlled from the rank shifting shaft 9 (Fig. 5) by means of a sprocket chain 10. Each end of this sprocket chain is attached to a collar or lug 11 mounted on the rod 7. The intermediate portion of the chain runs around a sprocket wheel 12 mounted on the shaft 9 and also around idler sprocket wheels 13. A short length of tubing 11a surrounds the rods 7 adjacent the points of attachment of the sprocket chains. This is for the purpose of preventing buckling of the rods under the pull of the chain. There are two rank shifting rods 7 for each rank so that a pillar on both sides of each platform is engaged; it is not necessary that all the pillars of a platform be engaged provided that one pillar on each side is engaged. In the arrangement shown the driving shaft 9 will extend right across the unit and will operate all four rank shifting rods, i. e. two for each rank, so as to move them simultaneously in one direction or the other. As, however, it will only be desired to move one of the ranks during such movement provision is made for rendering the rods operative or inoperative, and this is done by partially rotating the rods so that the forks 8 either extend in a horizontal direction and thus engage the pillars 4 of the platforms, or alternatively so that the forks 8 hang downwardly and thus can move along without shifting the platforms. For instance, in Fig. 11 the forks 8 are engaging the pillars 4 in the left-hand rank, but in the right-hand rank they are inoperative. The mechanism for changing over the positions of the rods, referred to herein as the phasing mechanism, is shown on the left-hand side of Fig. 6 and is also shown diagrammatically in Fig. 14. The rods are formed with square sectioned portions 14 at either end, and when the rods reach their extreme position of travel these square portions slide into sockets 15 which are rotatable, and each of which is provided with a crank arm 16 pivotally connected through links 17 with hydraulic servomotors 18. As will be observed from Fig. 14, one socket 15 of each rank is operated by one of the servomotors and the other socket of each rank by the other servomotor.

Figure 14:
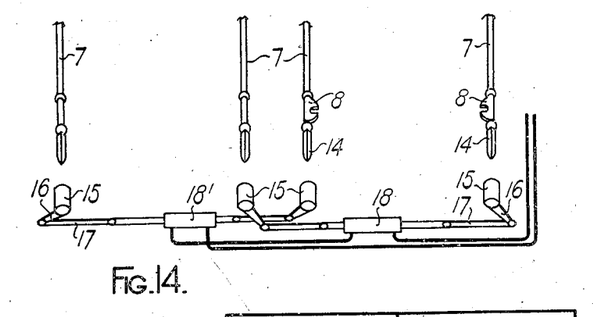
Fig. 14 is a somewhat diagrammatic perspective view showing the phasing apparatus at each end of a unit.

The portions 14 are tapered at the ends to facilitate movement into the sockets.

As will be seen from Fig. 14 the forks 8 in their operative positions point towards the centre of the rank with which they are associated, whilst in their inoperative position they hang downwardly and the arrangement employing the two servomotors is adopted on account of this. At intervals along their length the rods 7 are provided with spherical collar members 19. In the arrangement shown in Figs. 5, 8 and 11 these spherical collars are guided between the rail 3 and a guide member of angle section 20 so that each collar is located at three points but is, however, free to slide along the rail and angle member and also to rotate about the axis of the rod on which they are mounted.

In order to effect transfer of the platforms between the adjacent ends of the two ranks there is provided carriage apparatus which is movable transversely between the ranks, and mechanism is provided for lowering the platforms when in the end position so that the pillars 4 rest on the carriage apparatus.

Figure 6:
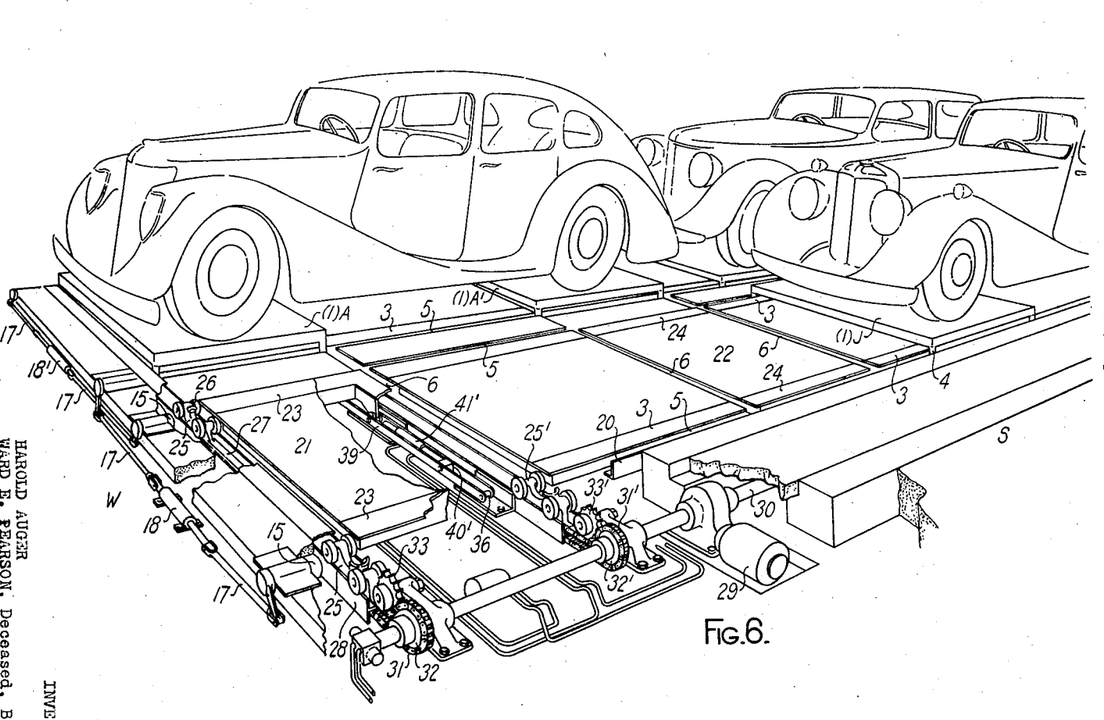
Fig. 6 is another pictorial view of the end of a unit in which the floor is also broken away to show the mechanism. The view shows the west end of the unit shown in Fig. 1.

Referring now to Fig. 6, the nearest car position is shown without any platforms, but supposing that the platforms 1(J) and 1(J') were moved to the left in the extreme position, the platform 1(J) would rest on the support section 21, referred to hereinafter as an elevator, and platform 1(J') would rest on the elevator section 22. These elevator sections 21 and 22 have rails 23 and 24 respectively constituting extensions of the fixed rails 3, and when platforms are resting on these elevator sections their wheels will be respectively supported by the rails 23 and 24. Provision, however, is made for lowering the elevator sections 21 and 22 so that the pillars 4 of the platforms will rest on carriages 25, 25'. The two carriages 25 support one side of the platform whilst the two carriages 25' (see also Fig. 7) support the other side. The carriages 25 are interconnected by a link 27 and the carriages 25' are interconnected by a link 27'. The carriages carry rollers 26 running on rails 28, 28', which rails in the example shown are constituted by girders of H-shape cross-section (Fig. 10), and the carriages are guided on the rails by vertically pivoted guide rollers 26a.

Figure 7:
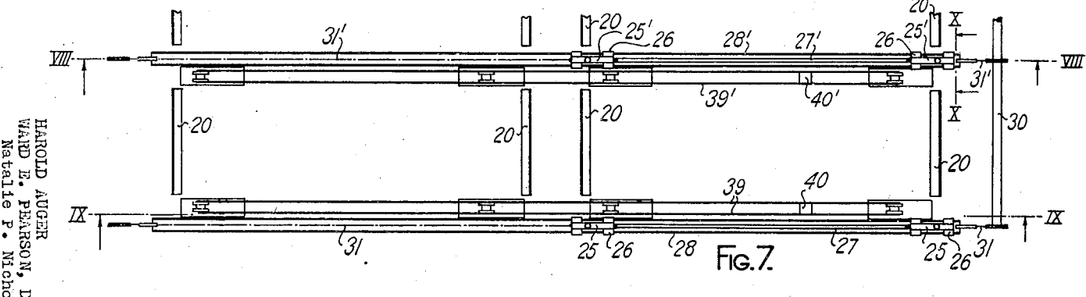
Fig. 7 is a plan view of a portion of the end of the unit shown in Fig. 6 with the floor and platforms removed.

In Figs. 6 and 7 the carriages are in the south-west position of Fig. 1, but they are movable across to the north-west position, i. e. the left-hand position of Fig. 7, and in so doing they would carry the platform with them, it being assumed, of course, that at such time the platforms 1(A) and 1(A') shown in Fig. 6 will have moved away from the north-west position.

The drive for moving the carriages 25 and 25' along the rails 28 and 28' is obtained from an electric motor 29 coupled, for instance, through worm gearing with a transfer shaft 30 which in turn drives sprocket chains 31 and 31' respectively connected to the two pairs of carriages. The sprocket chains 31 and 31' pass around sprocket wheels 32 and 32' keyed on the shaft 30 and are caused to wrap around these sprocket wheels by means of idler sprocket wheels 33 and 33'.

It will be appreciated that the mechanism described is that for moving one platform, i. e. the end platform, and that a similar mechanism will be provided for moving the complementary platform of the end set, that is for moving a platform located on the elevator section 22 into the position occupied by the platform 1(A') shown in Fig. 6. In such a case the carriage apparatus will be similarly driven by sprocket chains which are also passed around sprocket wheels mounted on the transfer shaft 30.

Figure 9:
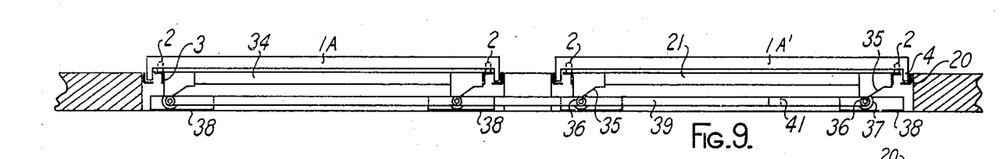
Fig. 9 is a vertical section on the line IX—IX of Fig. 7 also showing the platforms in position.
Figure 10:
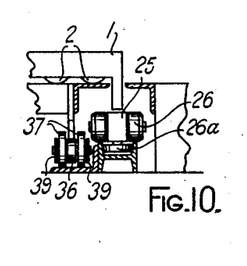
Fig. 10 is an enlarged sectional view taken on the line X—X of Fig. 7.

As previously mentioned, for the purpose of loading the platforms resting on the elevator sections 21 and 22 on to the apparatus, provision is made for lowering these elevator sections, and the mechanism for doing this is shown in Figs. 9 and 10.

The elevator section 21 is, of course, the same member that is shown in Fig. 6, whilst the support section 34 will be located under the platform 1(A) as shown in Fig. 9. As may be seen more clearly from Fig. 9 the support sections are formed of a flat top with an overhanging flange and with a downwardly depending flange, the two flanges which lie transversely, i. e. laterally of the ranks, are formed with cam edges 35 which rest on rollers 36. The rollers 36 are in their turn mounted in alignment with rollers 37 running on short rails 38.

It will be observed that all those rollers which are in alignment laterally are interconnected by link members 39, 39' extending laterally across the unit.

Each of these links is formed of spaced sides separated by spacing blocks 40, 40'.

Each elevator section is formed with four cam edges and the rollers associated with the links 39 support the cam edges along one side of each of the end support sections, whilst those rollers associated with the links 39' support the opposite edges of the same pair of sections. This will readily be appreciated from Fig. 7.

In the arrangement shown in Fig. 9, the support sections 21 and 34 are in their raised positions so that the platforms are resting on them.

If, however, the links 39 and 39' are moved to the right the rollers 36 will run along the cam edges 35 so that the elevator sections 21 and 34 will be lowered, and the arrangement is such that when they are lowered the pillars 4 will rest upon carriage members 25 and 25'.

At the positions in which the pillars 4 occur in the case of platforms resting on the elevator sections the guides 20 are broken so that the pillars 4 may pass down through the gaps to rest on the carriage members. This arrangement is shown best in Fig. 7.

The transverse movement of the links 39, 39' is produced by hydraulic servomotors of which the motor 41' operating the link 39' is shown in Fig. 6. The pistons of the servomotors are connected to the spacing blocks 40, 40'. In Figs. 7 and 9 the links and spacing blocks are shown but the servomotors are omitted, it will be understood however that they will be located between the two sides of each of the links.

Whilst Fig. 9 and Fig. 10 show the apparatus for the elevator sections 21 and 34 only it will be appreciated that a similar apparatus is provided for the section 22 and also the opposite elevator section which will lie underneath the platform 1(A) as shown in Fig. 6, and the operation of this will be co-ordinated with the mechanism for raising and lowering the elevator sections 21 and 34, so that all four elevator sections at an end of the unit will be raised and lowered simultaneously. To this end all four servomotors at an end of the unit may be connected in series as regards the hydraulic circuit, and this circuit may contain a hydraulic generator by which they are controlled.

From the arrangement described, it will be appreciated that the operation of transferring a pair of platforms between the two ranks consists in first lowering all four elevator sections so that the platforms to be transferred rest on the carriages, and then moving the carriages transversely from the one rank to the other rank and, finally, raising the elevator sections so that the platforms are raised from the carriages into the new rank. The elevator positions between which the carriages travel are also referred to sometimes as transfer positions.

Figure 8:
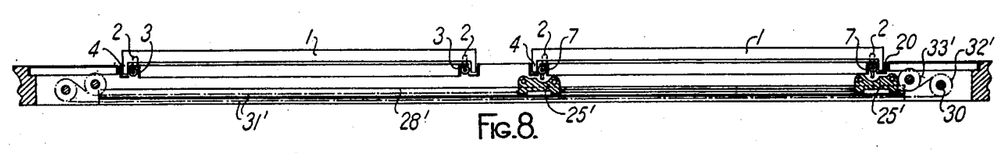
Fig. 8 is a vertical section on the line VIII—VIII of Fig. 7, but with the platforms placed in position.
Figure 11:
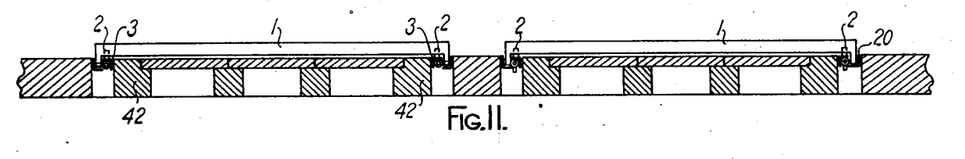
Fig. 11 is a sectional view taken across the unit at a point midway between the centre and one of the ends.
Figure 12:
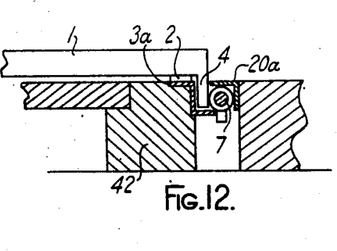
Fig. 12 is a detailed view drawn to an enlarged scale and showing an alternative form of the construction illustrated in Fig. 11.

In the arrangement shown in Figs. 8 and 11 the rank shifting rods 7 are placed on the inside of the pillars 4, and the rails 3 supporting the platforms project outwardly from the floor structure 42. Fig. 12 is a modified arrangement in which the rank shifting rods 7 are located on the outside of the pillars 4, and this arrangement has the advantage that the rails 3a can rest on the top of the floor structure 42 so that the weight of the trucks is borne directly by the floor structure. In this case also, the guide member 20 is replaced by a guide member 20a in which the horizontal flange is on the top instead of the bottom.

Figure 13:
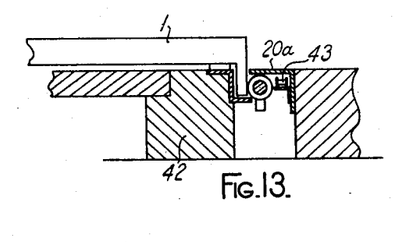
Fig. 13 shows how the construction shown in Fig. 12 can be modified at the centre of the unit.

Fig. 13 shows how the Fig. 12 construction is modified at the centre of the unit to allow for the rank shifting chain 10. It will be observed that the flange of the guide member 20a is widened and that underneath rollers 43 are provided over which the sprocket chain 10 will run.

Figure 15:
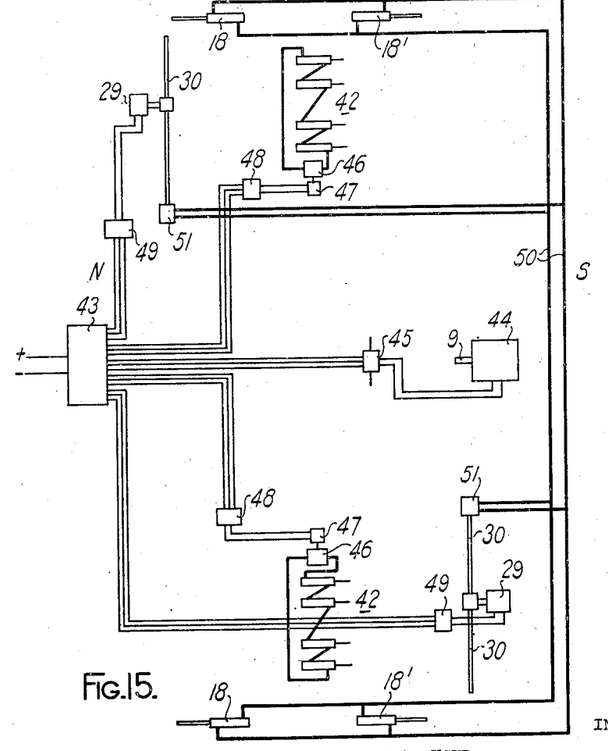
Fig. 15 shows diagrammatically the arrangement of the electrical and hydraulic connections.

Fig. 15 shows diagrammatically how the various controls would be connected up, the thin lines indicating electric connections and the thick lines indicating the hydraulic pipe lines.

In the arrangement shown it is intended that the apparatus should be controlled from an electrical drum controller 43 suitably driven by a pilot motor. It is so arranged that a successive rotation of the drum controller effects the various apparatus in the desired sequence and the pilot motor is designed to inch the controller forward sufficiently to initiate an operation, and then stop it as soon as the new operation commences, whilst at the conclusion of such operation the pilot motor is again started up and the drum controller moved forward to start the new operation in the sequence.

Figure 5:
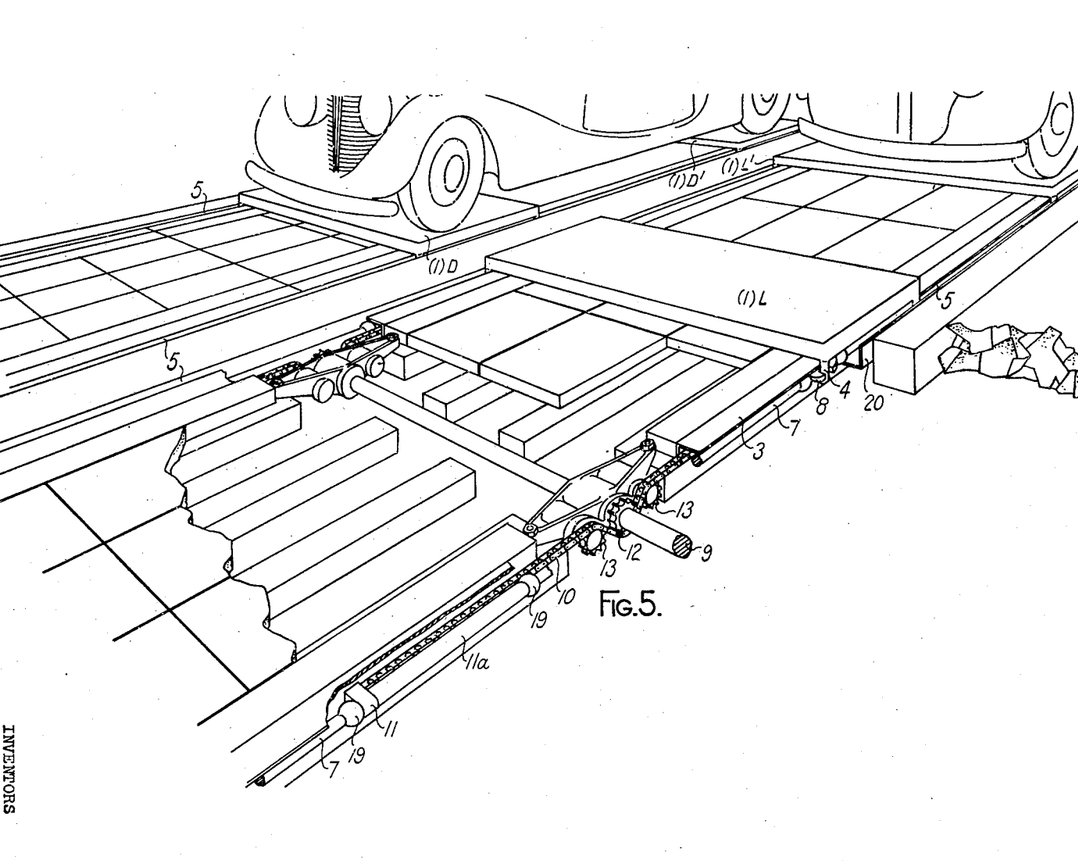
Fig. 5 is a pictorial view of the centre portion of the storage unit with part of the floor broken away to show the mechanism.

44 is a rank shifting motor and this is coupled to the rank shifting shaft 9 which is also shown in Fig. 5.

45 is a double acting limit switch for the rank movement which is operated when the rank shifting rods reach either end of their travel, when actuated the limit switch stops the rank shifting motor and starts up the pilot motor to rotate the drum controller to start the next operation. As the rank shifting rods will move alternatively in opposite directions the limit switch 45 may serve to change over the connections to the motor 44, the arrangement being such that the new circuit is prepared but not completed until the drum controller has been moved to the new position; when the new circuit is completed the motor 44 will, of course, be rotated in the opposite direction.

The elevator apparatus at each end of the unit is operated by a set of servomotors 42 and as shown in the drawing the servomotors of each set are connected in series, the hydraulic circuit including a generator 46 driven by an electric motor 47.

48 are changeover limit switches for the elevators; these may be operated, for instance, by movement of the links 39, 39'.

The action of these changeover limit switches is similar to that of the limit switch 45, i. e. to cut off the connection of the elevator motor at the end of the raising or lowering operation and to start up the pilot motor so that the next operation, which will be either a carriage movement or a rank shifting movement, takes place. As the elevators will operate alternatively, in opposite directions the limit switches 48 may serve to reverse the connections to the motor so that the circuit to it is broken until the drum controller has made a further movement as described in connection with the limit switch 45.

The carriage apparatus is controlled from the transfer shafts 30, of which one has been shown already in Figs. 6 and 7. These are driven by respective motors 29 which are also connected with the drum controller through changeover limit switches 49, which switches are actuated at the termination of the carriage movement, for instance, by catches on the carriages, or sprockets, or even by cam members driven through gearing from the transfer shafts 30.

The hydraulic cylinders 18 for effecting the phasing at each end of the unit are connected to supply lines 50, which are in turn connected with hydraulic generators 51 mounted on the transfer shaft 30.

In this manner it will be appreciated that phasing of the rank shifting rods occurs whilst the carriage apparatus is moving transversely.

The complete sequence of operations for circulating the sets of trucks will now be described.

Assuming that the trucks are initially in the positions shown in Fig. 1 and that it is desired to circulate them in a clockwise direction, the first movement will be for the rank shifting members to move eastwards.

The forks of the shifting rods associated with the north rank would be in the operative position so that the north trucks move eastwards; the forks of the south rank rods will, however, be inoperative and therefore have no effect.

The west carriage apparatus which normally rests in the north-west corner will now be moved south, the elevator apparatus at the west end is next operated so that the platforms HH are lowered on to the west carriage.

The carriages at the west end are moved north so that the platforms HH are moved into the north-west corner leaving a vacancy at the south-west corner; the elevators at the west end are operated so as to raise the platforms HH into alignment with the north rank.

The rank shifting rods are now moved westwards, the forks in the south rank being operative and those in the north rank inoperative, so that the platforms JJ are moved into the south-west position leaving a vacancy at the south-east position.

The carriage at the east end which is normally in the south-east corner position moves north.

The elevator apparatus at the east end is operated so that the platform sections DD which are at present in the north-east corner are lowered on to the carriage apparatus.

The carriage apparatus is moved southwards so that the sections DD are moved into the south-east corner.

Finally, the elevator apparatus at the east end is operated to raise platforms DD into alignment with the south rank.

There will now be a vacancy again in the north-east corner as shown in Fig. 1.

It will be appreciated that as a result of this sequence of movements all the sets of platforms and hence cars supported by them have been shifted around through one car position. By successively carrying out this cycle of movement the sets of platforms will be progressively shifted around the unit.

Referring now once again to the arrangement shown in Figs. 1 to 4, it will be observed that in the case of Figs. 1 and 2, in which there are two platforms per car, there are two grooves 5 extending along each rank, whereas in the arrangement of Fig. 3 there are four grooves per unit. In this respect the two-platform arrangement possesses advantage where it is desired to minimise the grooves so as to present as nearly a continuous floor as possible.

At the same time, however, the four-groove arrangement possesses some advantage as regards the elevator sections inasmuch as those are appreciably reduced in area. In the case of Fig. 1 the elevator sections of the west end of the unit will be those under the four platforms, A, A', H, H'; in the case of Fig. 3, however, the elevator sections will be under the four platforms A1 to A4, and also under the four platforms H1 to H4, and the space between the platforms A1 to A2 and between A3 and A4 and likewise in the case of the H platforms those between H1 and H2, and also H3 and H4 may all be formed by solid flooring.

Obviously other arrangements than those described may be employed; for example, cars may be arranged not only longitudinally but also laterally of the ranks, the particular arrangement employed depending, of course, upon the shape of the available storage space.

The apparatus specifically described above has been one in which there is one vacant space as shown in Figs. 1 and 3. In the case, however, in which there are two vacant spaces at opposite corners as shown in Figs. 2 and 4, the two ranks will move simultaneously in opposite directions. To this end there may be provided two rank shifting means respectively operating the two pairs of rods and in some cases mechanical connection may be provided between the two ranks to ensure synchronous movement.

Similarly, a transfer at the two ends will take place simultaneously in opposite directions. The rank shifting and transfer operations will, of course, alternate.

In order, however, that with the rank shifting apparatus described the transfer operations can take place at the two ends of the unit simultaneously with this modified arrangement it is necessary to ensure that the rank shifting rods 7 shall not obstruct the lateral movement of the platforms by obstructing movement of the pillars, and accordingly when the two spaced arrangement is employed as shown in Figs. 2 and 4, after a rank movement the rods 7 will be moved in the reverse direction to a mid-position longitudinally of the ranks before transfer movement takes place. It will be appreciated that whereas in Figs. 1-4 the sets of platforms have been spaced close together so as to reduce the size of the figures, in actual practice they would be spaced apart by considerably greater amount, that is to say that in Fig. 1, for instance, platforms A' and B would be very much further apart, and by causing the rod to engage only the inner pillars of the end trucks, e. g. the right-hand pillars of platform A, the apparatus may be so designed that when the rods are moved backwards after a rank movement they will be clear of the end set of platforms. It is, of course, necessary that the spacing between the sets of platforms shall be greater than that between the component platforms of a set, e. g. A' and B must be spaced apart a greater distance than A and A'. Obviously with all the arrangements other forms of rank shifting apparatus might be employed, e. g. endless chains.

As shown in the drawings the storage space or garage may be formed with a base or subfloor on which the mechanism is mounted whilst the actual garage floor is raised above this and may conveniently be constructed of precast concrete blocks supported on ridges on the base extending along the ranks.

We claim:

1. Storage equipment for automobiles in a single horizontal plane including a unit having a plurality of movable platforms arranged to support the automobiles in two ranks which are side-by-side in substantially the same horizontal plane, said platforms including a set of at least two spaced and independent platforms for supporting the wheels of each automobile so arranged that not more than two wheels of an automobile will rest on the same platform and diagonally opposite wheels will rest on different platforms, apparatus associated with both ranks for shifting all the platforms in a rank synchronously along the rank, apparatus for transferring sets of platforms between adjacent ends of the two ranks whilst maintaining the relative positioning of the component platforms of a set, and at least one automobile space being vacant of platforms so that by successive rank shifting and transfer operations the sets of platforms, and hence automobiles supported thereby, may be circulated around the unit.

2. Storage equipment for automobiles in a single horizontal plane including a unit having a plurality of movable platforms arranged to support the automobiles in at least two ranks which are side-by-side in substantially the same horizontal plane, said platforms including a set of at least two spaced and independent platforms for supporting the wheels of each automobile, so arranged that not more than two wheels of an automobile will rest on the same platform and diagonally opposite wheels will rest on different platforms, apparatus for transferring sets of platforms between corresponding positions in a pair of ranks in such manner as to maintain the relative positioning of the component platforms of each set during said transfer operation, said transfer apparatus comprising carriage apparatus movable between carriage positions in the two ranks, supports for the platforms in the carriage positions of the two ranks and means for effecting relative vertical movement between said supports and said carriage in such manner as to load and unload the carriage, together with means for shifting said sets of trucks along the ranks on to and off from the supports in the carriage positions.

3. Storage equipment for automobiles including a floor and a plurality of platforms arranged to support the automobiles and movable over the floor, said platforms being arranged in sets, each set comprising at least two platforms spaced apart so as to be adapted to support the wheels of an automobile and so arranged that not more than two wheels will rest on the same platform and diagonally opposite wheels will rest on different platforms, said sets of platforms being arranged in parallel ranks, supports for said platforms permitting movement along the ranks, pillar members depending from positions adjacent the corners of each of said platforms, means for transferring sets of platforms between transfer positions in a pair of adjacent ranks, said transfer means including supports for said pillars, means for effecting relative vertical movement between the rank supports and the pillar supports so as to load and unload said pillar supports with sets of platforms in the transfer positions, and means for moving sets of platforms synchronously between the respective transfer positions, whilst supported by said pillars and grooves in said floor extending along the ranks and transversely of the ranks and positioned to accommodate the pillars during movement of the platforms along the ranks and transversely between the ranks.

4. Storage equipment for automobiles including a floor and a plurality of platforms arranged to support the automobiles and movement over the floor, said platforms being arranged in sets, each set comprising at least two platforms spaced apart so as to be adapted to support the wheels of an automobile and so arranged that not more than two wheels will rest on the same platform and diagonally opposite wheels will rest on different platforms, said sets of platforms being arranged in parallel ranks, supports for said platforms permitting movement along the ranks, pillar members depending from positions adjacent the corners of each of said platforms, means for transferring sets of platforms between transfer positions in a pair of adjacent ranks, said transfer means including pillar supports, means for effecting relative vertical movement between the rank supports and the pillar supports so as to load and unload said pillar supports with sets of platforms in the transfer positions, and means for moving sets of platforms synchronously between the respective transfer positions whilst supported by said pillars, and grooves in said floor extending along the ranks and transversely of the ranks and positioned to accommodate the pillars during movement of the platforms along the ranks and during movement transversely between the ranks, and rank shifting members adapted to engage said pillar members so as to move said sets of platforms into and out of said transfer positions.

5. Storage equipment for automobiles including a unit comprising a floor and a plurality of platforms arranged to support the automobiles and movable over the floor, said platforms being arranged in sets, each set comprising at least two platforms spaced apart so as to be adapted to support the wheels of an automobile and so arranged that not more than two wheels will rest on the same platform and diagonally opposite wheels will rest on different platforms, said platforms being arranged in parallel ranks, supports for said platforms permitting movement along the ranks, pillar members depending from positions adjacent the corners of each of said platforms, groves in said floor extending along said ranks and positioned to accommodate the pilars during movement along a rank, means for transferring sets of platforms between adjacent ends of the two ranks, said transfer means including pillar supports, means for effecting relative vertical movement between said pillar supports and the rank supports in the end positions and means for shifting sets of platforms synchronously between the ranks whilst spported by the pillars, together with means for engaging said pillars and shifting all the sets of platforms in a rank, and automatic control means operatively connected with the rank shifting and transfer apparatus, whereby said movements occur in a recurring sequence such as to circulate sets of platforms around the unit.

6. Storage equipment for automobiles including a floor and a plurality of platforms arranged to support the automobiles and movable over the floor, said platforms being arranged in sets, each set comprising at least two platforms spaced apart so as to support the wheels of an automobile and so arranged that not more than two wheels will rest on the same platform and diagonally opposite wheels will rest on different platforms, said sets of platforms being arranged in parallel ranks, anti-friction members permitting movement of said platforms along the ranks, pillar members depending from said platforms, grooves in said floor extending along the ranks and positioned to accommodate the pillars during movement of the platforms along a rank, means for transferring sets of platforms between transfer positions in a pair of adjacent ranks, said transfer means comprising carriage apparatus movable between the two ranks and adapted to support the pillars of a set of platforms and means for loading and unloading said carriage apparatus with sets of platforms, and grooves in said floor extending transversely of the ranks and arranged to accommodate the pillars during transverse movement of the platforms.

7. Storage equipment for automobiles including a floor and a plurality of platforms arranged to support the automobiles and movable over the floor, said platforms being arranged in sets, each set comprising a pair of platforms spaced apart so as respectively to support pairs of wheels at opposite ends of an atuomobile, said sets of platforms being arranged in parallel ranks, anti-friction members permitting movement of said platforms along the ranks, pillar members depending from said platforms, grooves in said floor extending along the ranks and positioned to accommodate the pillars during movement of the platform along a rank, means for transferring sets of platforms between tranfer positions in a pair of adjacent ranks, said transfer means comprising carriage apparatus movable between the two ranks adapted to support the pillars of a set of platforms and means for loading and unloading said carriage apparatus with sets of platforms, and grooves in said floor extending transversely of the ranks and arranged to accommodate the pillars during transverse movement of the platforms.

8. Storage equipment for automobiles including a unit comprising a floor and a plurality of platforms arranged to support the automobiles and movable over the floor, said platforms being arranged in sets each set comprising at least two platforms spaced apart so as to be adapted to support the wheels of an automobile and so arranged that not more than two wheels will rest on the same platform and diagonally opposite wheels will rest on different platforms, said sets of platforms being arranged in a pair of parallel ranks which are side-by-side, anti-friction members supporting said platforms permitting movement along the ranks, pillar members depending from said platforms, grooves in said floor etxending along the ranks and positioned to accommodate the pillars during movement of the platforms along the ranks, means for transferring sets of platforms between adjacent ends of the two ranks, said transfer means comprising carriage apparatus movable between the two ranks and adapted to support the pillars of a set of platforms, supports for said sets of platforms in the end rank, position means for effecting relative vertical movement between the end supports and the carriage apparatus for loading and unloading said carriage apparatus, apparatus associated with both ranks for shifting all the platforms in a rank synchronously along the rank and control apparatus operatively connected with the rank shifting apparatus, with the carriage apparatus and with the loading and unloading apparatus whereby said apparatus may be automatically operated in a recurring sequence such as to effect circulation of the platforms around the unit.

HAROLD AUGER.
NATALIE PEARSON NICHOLSON,
*Executrix of the Estate of Ward Edgerly Pearson.*